United States Patent [19]
Wigen

[11] Patent Number: 5,908,549

[45] Date of Patent: *Jun. 1, 1999

[54] FILTRATION AND REGENERATION SYSTEM

[76] Inventor: Gerald W. Wigen, 6841 Cardinal Cove Dr., Minnetrista, Minn. 55364

[ * ] Notice: This patent is subject to a terminal disclaimer.

[21] Appl. No.: 08/921,159

[22] Filed: Aug. 29, 1997

Related U.S. Application Data

[63] Continuation-in-part of application No. 08/739,721, Oct. 29, 1996, Pat. No. 5,858,216.

[51] Int. Cl.$^6$ ..................................................... B01D 24/46
[52] U.S. Cl. ......................... 210/126; 210/140; 210/143; 210/190
[58] Field of Search .................................. 210/123, 126, 210/140, 143, 190, 191, 269

[56] References Cited

U.S. PATENT DOCUMENTS

| | | | |
|---|---|---|---|
| 2,972,412 | 2/1961 | Lundeen | 210/123 |
| 3,079,949 | 3/1963 | Lundeen | 137/599.1 |
| 3,190,446 | 6/1965 | Griswold | 210/126 |
| 3,977,968 | 8/1976 | Odland | 210/687 |
| 4,889,623 | 12/1989 | Prior et al. | 210/190 |

*Primary Examiner*—Ivars Cintins
*Attorney, Agent, or Firm*—Hugh D. Jaeger

[57] ABSTRACT

A filtration and regeneration system for in-line filtration of dirt and impurities from a brine/solution having contaminant flushing capabilities and a direct non-saturated feed of liquid resin cleaners to resins or filter media. An alternate embodiment includes the filtration and regeneration system in combination with other components, including a control panel and controlled valving, to provide a brine reclamation system.

4 Claims, 4 Drawing Sheets

FILTRATION AND REGENERATION SYSTEM

CROSS REFERENCES TO CO-PENDING APPLICATIONS

This patent application is a continuation-in-part of Ser. No. 08/739,721 entitled "FILTRATION AND REGENERATION SYSTEM" filed on Oct. 29, 1996, now U.S. Pat. No. 5,858,216, by the same inventor.

BACKGROUND OF THE INVENTION

1. Field of the Invention

The present invention is for a liquid treatment system, and more particularly, pertains to a unique multi-purpose brine line filtration system, which filters brine water, displays brine line vacuum levels, and provides for injection of concentrated resin or filter media liquid cleaners into the corresponding pressure vessels.

2. Description of the Prior Art

Oftentimes, the regeneration brine or chemicals used to regenerate such products as ion exchange systems or media type filtration systems contain sediment, sand or other particulates. The existence of these impurities in brine feed water used for regeneration purposes causes damage to regeneration control valves, as well as fouling of the resin, filtration media, and lower distribution systems. The filtration and regeneration system of this invention prevents these impurities from entering this equipment.

Resin cleaners, ion exchange resins or filtration media filters often require cleaners. These chemical cleaners are almost always harsh chemicals, which may cause injury or other health concerns if the operator is not careful when administering them. These chemicals must be used in a liquid form, and are typically poured into the brine regeneration tank. Splashes and spills are very common when this procedure is performed. In addition, once these chemicals are poured into the brine tank, they dilute with the brine liquid in the tank, which weakens the strength of the cleaners. As a result, more chemical is required.

The older conventional means of filtering sediment from the brine draw liquid was to use gravel in the bottom of the brine tank. This would trap and filter the brine liquid before it was drawn into the softener and/or filter resin tank.

To check for brine suction, it was necessary to disconnect the brine line at some point, attach a vacuum gauge, and then manually index the softener or filter to the brine draw position. Once the actual reading was completed, the disassembled brine line had to be re-assembled.

To resin clean the softener/filter, it was necessary to pour a liquid concentration of cleaner into the system's brine tank. This procedure would dilute the cleaner with the liquid brine already in the tank. The other option was to remove the top cover of the softener/filter/pressure tank, drain down the tank, and pour the liquid cleaner in the top tank opening directly.

Prior art water softening systems often involved the unnecessary waste of brine during the regeneration cycle of a filter/softener/pressure tank by sending brine solution directly to a drain, thus incurring unnecessary brine solution replacement expense.

Prior art water softening systems often required visual inspection of the salt level in the brine/solution tank, which proved to be a tedious and cumbersome task.

SUMMARY OF THE INVENTION

The general purpose of the present invention is to prevent sediment, sand or other particulate from causing damage to water softening and/or media filters during the brine cycle of normal regeneration. In addition, the system of the invention displays brine suction by use of a vacuum gauge, and provides for uses of liquid resin or media cleaners without further dilution in the brine tank.

The purpose of this invention is to protect the water softener/filter from becoming damaged or fouled due to any sediment or particulate in the regenerate solution. The invention permits the operator/owner to visually observe the performance of the system's brine draw cycle; and the invention allows resin cleaning solutions to be used without unnecessary further dilution or disassembly of the entire system. Structural components are plastic with a stainless steel screen or screen of other corrosion resistant material. An arrangement of valves and a pressure gauge in conjunction with a housing and a filter sump allow for filtration of brine/solution, flushing of contaminants, regeneration of filter/softener media, and monitoring of system pressure.

The filtration and regeneration system is available in both a manual or automatic backwashing or flushing design, without the need for any disassembly to the system. This system relies on either water or air pressure for normal operation. All necessary shutoff valves, for repair or maintenance, are incorporated into each system. A single stainless steel screen or screen of other corrosion resistant material, which spins as liquid passes through the system, forces particulate to the bottom of the system where it is flushed for cleaning.

The filtration and regeneration system permits the owner or equipment operator to visually determine if the water treatment system is properly providing the necessary vacuum to inject, by suction, the required brine and/or other liquid chemicals used during a normal regeneration.

In addition, ion exchange resins and/or other filter media often require various types of cleaning chemicals. The filtration and regeneration system permits the owner/operator to inject, by vacuum, these concentrated chemicals into his equipment, without further diluting these chemicals with the brine water that is normally stored in the brine tank of his water softeners or filters.

An alternate embodiment provides a brine reclamation system combining the filtration and regeneration system with other components, including a control box enclosure and internal components therein, to provide a brine reclamation system. The control box enclosure includes a normally open drain valve and a normally closed brine reclaim valve operated by a series of timers and other control devices to either permit drainage overboard of brine solution from a filter/softener/pressure tank or, by actuating of the drain valve and brine reclaim valve, send brine from the filter/softener/pressure tank to the brine tank as part of the reclaiming process. Also included in the control box enclosure is a salt low level sensor and aural and visual warning devices on a control panel. Annunciator lights on the control panel illuminate according to which cycle the control box enclosure is currently active.

One significant aspect and feature of the present invention is the filtration of sediment, sand or other particulates from a brine/solution used for regeneration of filter/softener media.

Another significant aspect and feature of the present invention is the use of a spin-down mesh screen to direct sediment, sand or other particulates to the lower region of a sump.

Yet another significant aspect and feature of the present invention is the incorporation of a sump which can be drained without disassembly.

Still another significant aspect and feature of the present invention is the ability to readily and easily provide for the injection of resin cleaning media into a filter/softener/pressure tank for regeneration.

Still another significant aspect and feature of the present invention is the induction of filter/softener cleaners directly into the filter/softener/pressure tank without brine/solution dilution.

A further significant aspect and feature of the present invention is a pressure/vacuum gauge permitting the operator to immediately observe the brine suction vacuum level, to determine if proper brine draw is occurring. This visual inspection will alert the operator if a service problem is occurring in the brine cycle of regeneration.

A still further significant aspect and feature of the present invention is a clear plastic sump permitting the operator to visually see when the brine draw and brine refill cycles have been completed, as the flow of liquid ceases in each of these cycles. In addition, the clear sump allows the operator to visually see when the filtration and regeneration system needs to be flushed or cleaned.

A yet further significant aspect and feature of the present invention is the filtration and regeneration system shutoff valves permitting easy disassembly of the system for repair or maintenance, as well as serving to provide a safety shutoff means to make repairs to the brine/solution tank, should they be necessary.

Another significant aspect and feature of the present invention is a brine reclamation system incorporating a control box enclosure having a control panel and appropriate valving plumbing and union connectors which can be readily installed and used with existing brine/solution tanks, filter/softener/pressure tanks, and associated control valving.

Another significant aspect and feature of the present invention is a brine reclamation system which reclaims and reuses a large portion of brine solution instead of wasting the brine solution by passing it down a drain.

Another significant aspect and feature of the present invention is a brine reclamation system having a control panel which annunciates the operation of the brine reclamation system.

Another significant aspect and feature of the present invention is a salt low level warning system which includes visual and aural warnings of a low salt level.

Another significant aspect and feature of the present invention is a filtration and regeneration system in combination with a brine reclamation system which also includes a cycle annunciator control panel which includes a salt low level warning.

Another significant aspect and feature of the present invention is a brine reclamation system which filters impurities from the brine solution prior to entry to a filter/softener/pressure tank, and which also reclaims a portion of the brine solution after and/or during regeneration.

Another significant aspect and feature of the present invention is the reduction of salt operating cost by reclaiming the salt via brine reclamation.

Having thus described embodiments and significant aspects and features of the present invention, it is the principal object of the present invention to provide a filtration and regeneration system and a filtration and regeneration system incorporated with other components to provide a brine reclamation system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
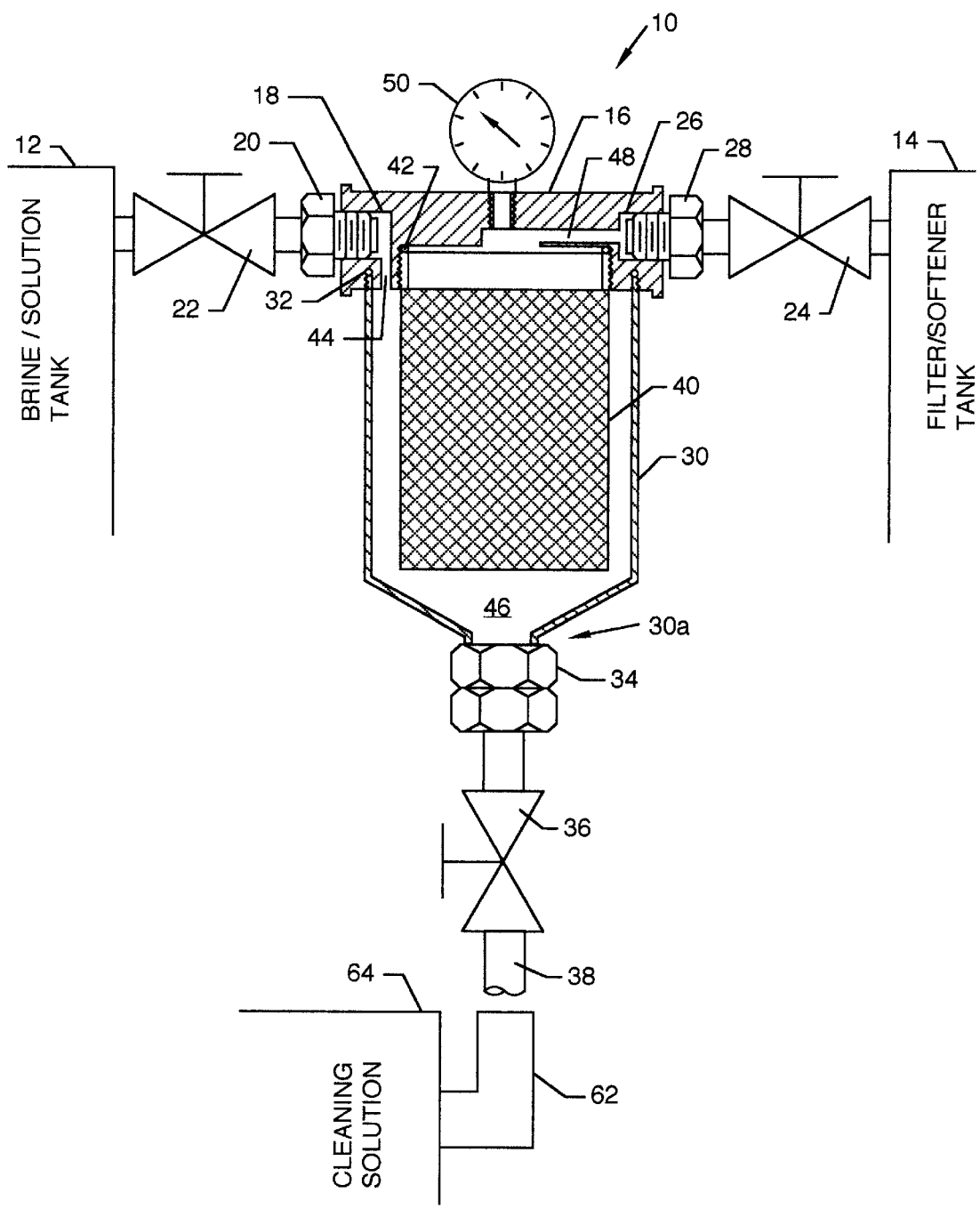
FIG. 1 illustrates a filtration and regeneration system.

FIG. 1 illustrates a filtration and regeneration system 10, the present invention, in use between a brine/solution tank 12 and a filter/softener/pressure tank 14. Non-corrosive metal or PVC component members are incorporated into the design of the present invention. A manifold housing 16, fashioned of PVC or other non-corrosive material, such as non-corrosive metal or plastic, is centrally located to serve as a mounting platform for various non-corrosive component members. A first or inlet port 18 is located at one end of the housing 16 for receiving a connector nipple 20. A shutoff valve 22 is appropriately plumbed between the brine/solution tank 12 and the inlet port 18 via connector nipple 20. Correspondingly, a shutoff valve 24 is appropriately plumbed between the filter/softener/pressure tank 14 and a second or outlet port 26 via a connector nipple 28. A clear plastic filter sump 30 screwingly engages the lower portion of the housing 16 and is sealed thereto by an O-ring 32. The lower end 30a of the filter sump 30 is threaded or otherwise appropriately configured to receive a connector member 34 which is appropriately plumbed to a third or drain/shutoff valve 36 and tube 38 which is used as a shutoff for drainage or induction of cleaning fluids, as later described in detail. Located inside of the filter sump 30 is a corrosion resistant fine mesh screen 40, such as stainless steel or other suitable material, which screwingly engages the lower portion of the housing 16 and is sealed thereto by an O-ring 42. The fine mesh screen 40 is a spin-down type which rotates inside the filter sump 30 as the screen 40 is exposed to liquid flow across the screen 40. Fluid inlet flow is provided into the filter sump 30 by a passage 44 located adjacent to the inlet port 18. Foreign objects suspended in liquid from the brine/solution are forced downwardly by the rotating spin-down style fine mesh screen 40 to accumulate in the lower region 46 of the filter sump 30. Cleansed brine/solution is forced through the mesh screen 40 into a passage 48 in the housing 16 leading to the outlet port 26. The mesh screen can be a size such as 140. A pressure gauge 50 for indication of positive or negative pressure mounts to the upper region of the housing 16 and is plumbed to the passage 48.

Figure 2:
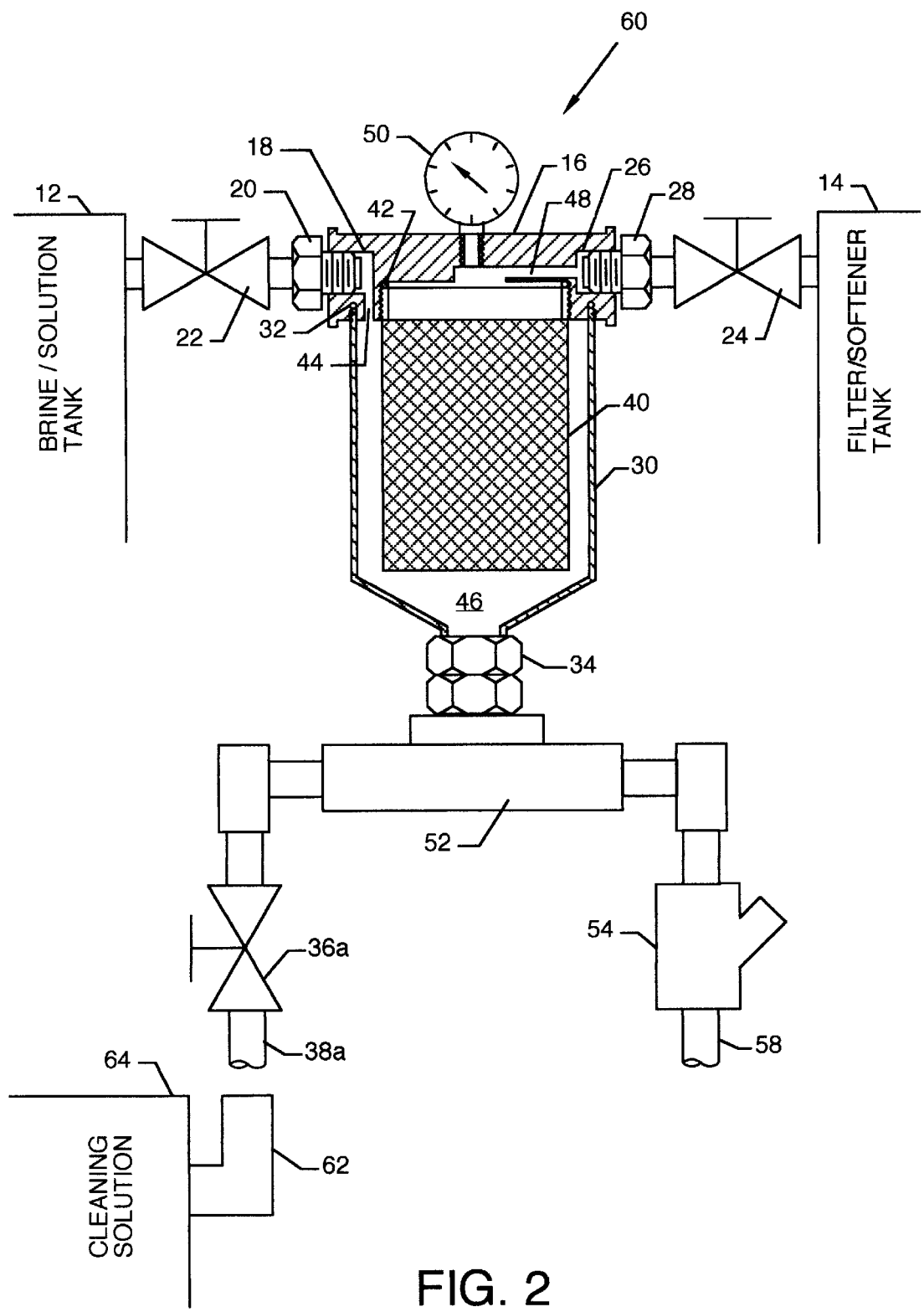
FIG. 2, a first alternative embodiment, illustrates a filtration and regeneration system having an optional flush arrangement.

FIG. 2, a first alternative embodiment, illustrates a filtration and regeneration system 60 which additionally includes an optional automatic backwash and flush arrangement, where all numerals correspond to those elements previously described. The arrangement in FIG. 2 includes the members illustrated in FIG. 1, where the shutoff valve 36 and tube 38, now designated as shutoff valve 36a and tube 38a, have been relocated and appropriately plumbed to one end of a manifold 52. Manifold 52 is internally plumbed to the interior of the filter sump 30 by the connector member 34. Also connected to the manifold 52 is a diaphragm valve 54 having a pipe 58.

Mode of Operation

Normal operation of the filtration and regeneration system 10 is accomplished by flow of liquid from the brine/solution tank 12 through open shutoff valve 22. Brine/solution from the brine/solution tank 12 flows through passage 44 into the filter sump 30 and against the spin-down mesh screen 40 where dirt, sediment and the like are spun off to and accumulated in the lower region 46 of the filter sump 30. Cleansed brine/solution is forced or drawn through the mesh screen 40 and through the passage 48. From passage 48 the cleansed brine/solution passes through open shutoff valve 24 into the filter/softener/pressure tank 14 for regeneration of filter/softener/pressure media in the filter/softener/pressure tank 14. Timed pumping and drainage systems known to the art are incorporated to pump or draw brine/solution from the brine/solution tank 12 through the filtration and regeneration system 10 and to drain byproducts of regeneration from the filter/softener/pressure tank 14. Pressure gauge 50 indicates pressure or vacuum in the passage 48. Manual flushing of the filter sump 30 is accomplished by opening shutoff valve 36 during the pressurized mode to force contaminants and sediment in the lower region 46 of the filter sump 30 through the tube 38, which can conveniently lead to a drain or sediment reservoir.

Also featured is a resin cleaning feature for cleaning of the interior members of the filtration and regeneration system 10 and the regeneration media contained in the filter/softener/pressure tank 14. A flexible hose 62 can be connected to the tube 38 and led to a cleaning solution container 64. The filter/softener/pressure tank apparatus is then indexed to the brine draw mode to provide a negative pressure in the passage 48 as evidenced by the reading on pressure gauge 50. The shutoff valve 22 is then manually closed and the shutoff valve 36 is manually opened. This condition now begins to empty, by suction, the cleaning solution container 64. Once the required amount of cleaning solution from the cleaning solution container 64 is used, the shutoff valve 36 is manually closed and shutoff valve 22 is manually reopened, thus restoring the filtration and regeneration system to normal operation. The mesh screen 40 can be accessed for cleaning or replacement by closing shutoff valves 22 and 24, and opening shutoff valve 36 to relieve pressure.

Operation of the filtration and regeneration system 60, now referenced to shutoff valve 36a and tube 38a, is the same as that described for the filtration and regeneration system 10, but includes an automatic flush function for automatic flushing of the filter sump 30. Diaphragm valve 54 is actuated, such as by volumetric reference or timed reference, allowing contaminants to be removed from the lower region 46 of the filter sump 30 and dumped overboard through the diaphragm valve 54, which serves as a flow controller, through pipe 58 to a drain or sediment reservoir. In the alternative, the flow controller diaphragm valve 54 can be operator actuated by an input to the flow controller diaphragm valve 54.

Figure 3:
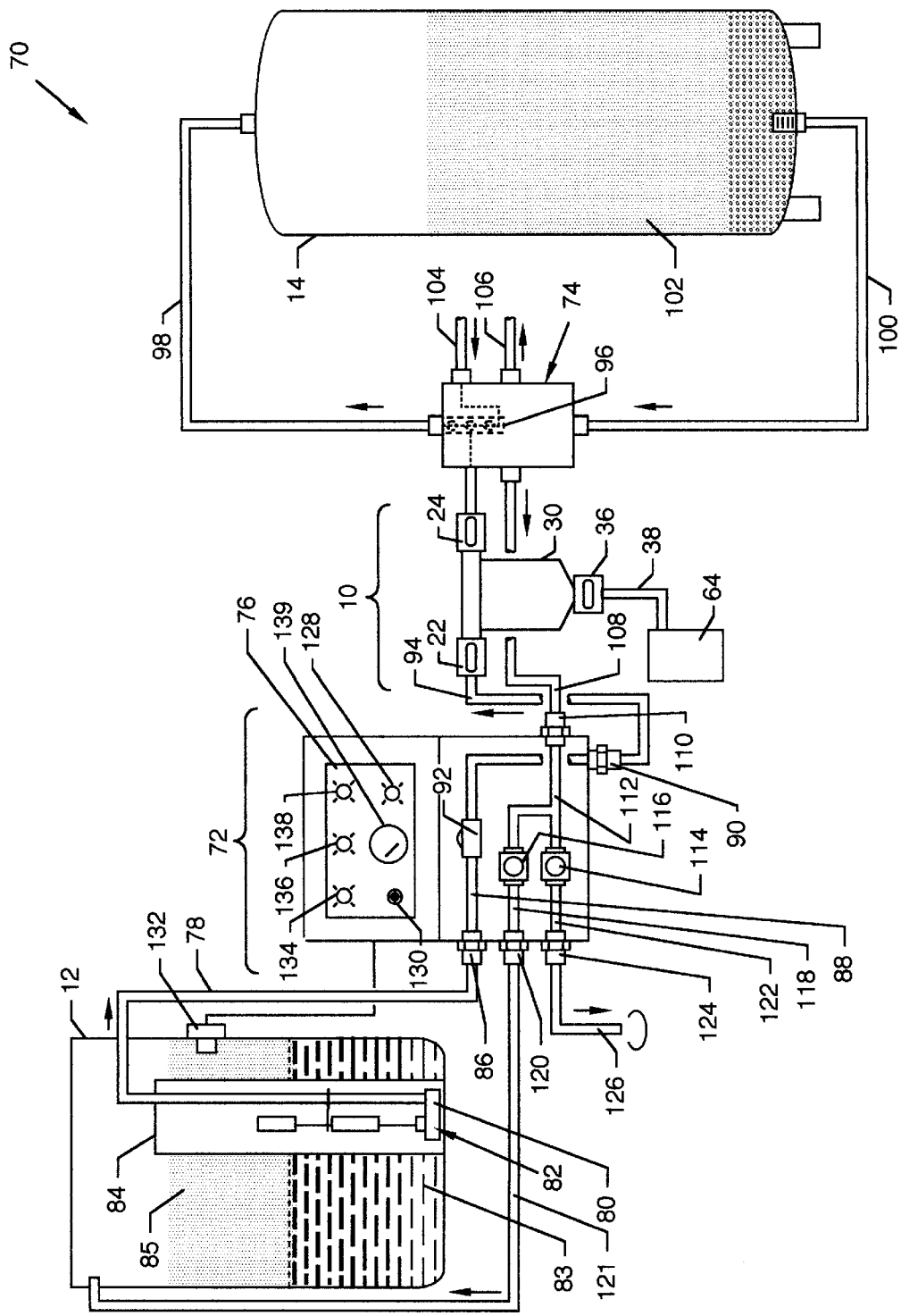
FIG. 3 illustrates a brine filtration and regeneration system combined with a brine reclamation system; and, FIG. 4 illustrates a control diagram for the control panel.

FIG. 3 illustrates a brine filtration and regeneration system 10, previously described in FIG. 1, combined with a brine reclamation system 70, where all numerals correspond to those elements previously described. In the alterative, filtration and regeneration system 60 of FIG. 2 can be incorporated in place of the brine filtration and regeneration system 70. An NEMA rated control box enclosure 72 and a control valve housing 74 are also incorporated in the brine reclamation system 70. The brine reclamation system 70 can be used with existing brine/solution tanks and filter/softener/pressure tanks, and includes a plurality of union connectors for ready hook-up. The control box enclosure 72 includes a control panel 76 and a plurality of piping arrangements having valves and a flow switch spanning and connected to one end of union connectors at the control box enclosure sides and bottom. A brine suction line 78 connects at one end to the base 80 of a float switch assembly 82 housed in a float switch enclosure 84 in the brine/solution tank 12 containing brine 83 and salt 85. A union connector 86 mounted to the side wall of the control box enclosure 72 accommodates the other end of the brine suction line 78 and also connects to a brine suction pipe or line 88 located in the control box enclosure 72. Brine suction pipe 88 also connects to a union connector 90 mounted in a bottom wall of the control box enclosure 72. A flow switch 92 connects in the brine suction pipe 88 to sense brine flow through the brine suction pipe 88 and to trigger a brine draw timer. Another brine suction line 94 connects and supplies the control valve housing 74 through the filtration and regeneration system 10, previously described. Brine suction line 94 continues to an eductor 96, which is mounted on, connected to, and supplying the control valve housing 74. Also connected to the control valve housing 74 is a line 98 connected to the top of the filter/softener/pressure tank 14 and a line 100 connected to the bottom of the filter/softener/pressure tank 14. The filter/softener/pressure tank 14 is filled with an appropriate filtration medium 102, such as resin or other suitable material. Also connected to the control valve housing 74 is a raw water input line 104 and a treated water outlet 106. One end of a transfer/dump line 108 also connects to the control valve housing 74 and the other end to a union connector 110 on one side of the control box enclosure 72. A transfer/dump pipe 112 in the control box enclosure 72 connects to the union connector 110 and splits to connect to a drain valve 114 and to a brine reclaim valve 116. A brine reclamation pipe 118 connects between the brine reclaim valve 116 and one side of a union connector 120 located on one side of the control box enclosure 72, and a brine reclamation line 121 connects between the union connector 120 and the upper level of the brine/solution tank 12. A drain pipe 122 connects between the drain valve 114 and one side of a union connector 124 located on one side of the control box enclosure 72, and a drain line 126 connects to the outboard side of the union connector 124.

The control panel 76 includes controls, visual and audible warning devices, and advisory lights and a vacuum/pressure gauge. A salt low level annunciator light 128 and alarm horn 130 are operated by a proximity switch 132 located on the side wall of the brine/solution tank 12 to warn the user of a low salt level in the brine/solution tank. The salt low level annunciator light 128 can be depressed to cancel the light and alarm horn warnings. Other included lights and controls and indicators are an in-service light 134, a brine cycle light 136, a brine reclaim light 138, and a stainless steel vacuum/pressure gauge 139, which is appropriately plumbed to the brine suction pipe 88.

Figure 4:
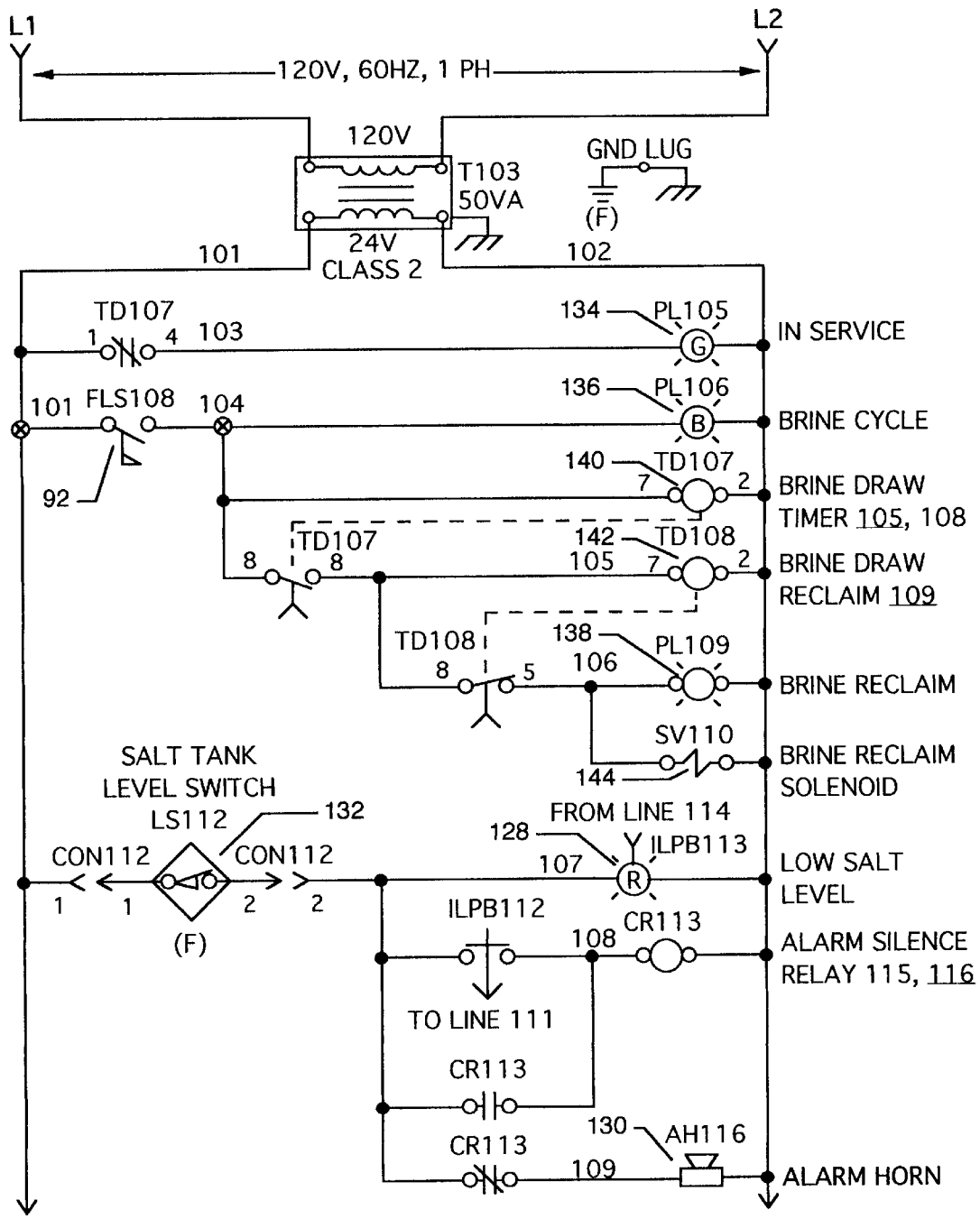

FIG. 4 illustrates a control diagram for control panel 76, where all numerals correspond to those elements previously described.

Mode of Operation

FIG. 3 best illustrates, with reference to FIG. 4, the mode of operation of the brine reclamation system 70. During normal water treatment to soften water, raw water is introduced to the control valve housing 74 through the raw water input line 104. The control valve housing 74 routes raw water through the line 98 and into the filter/softener/pressure tank 14 for cleansing and treating by medium 102 in the filter/softener/pressure tank 14. The treated water then exits the filter/softener/pressure tank 14 through line 100 and through the control valve housing 74 and is routed through the treated water outlet 106.

During the brining cycle, control valve housing 74 repositions to send raw water from the raw water input line 104 through the eductor 96 causing brine 83 to be drawn from the brine/solution tank 12 and mixed with raw water passing through the eductor 96 and sent via line 98 to the filter/softener/pressure tank 14 for a brining cycle. Brine 83 is drawn through the float switch assembly 82, the brine suction line 78, through the brine suction pipe 88 and flow switch 92 in the control box enclosure 72, through the brine suction line 94 and the filtration and regeneration system 10 for brine cleansing, as previously described, and through the control valve housing 74 and line 98 into the filter/softener/pressure tank 14. During the first portion of brining cycle, flow switch 92 senses brine flow and activates the brine cycle light 136 and a brine draw timer 140 which, for purposes of example and illustration, initiates a 35-minute timing cycle. Float switch assembly 82 detects level of brine solution in brine solution tank. During this 35-minute time segment, solution exits the filter/softener/pressure tank 14 through line 100 and flows through the control valve housing 74, through transfer/dump line 108, through transfer/dump pipe 112, through drain valve 114 which is normally open, and through drain pipe 122 and drain line 126 to a drain. Brine reclaim valve 116 is normally closed, thereby prohibiting brine flow through the brine reclamation pipe 118. Prior to the end of the 35-minute time segment, a slow rinse also occurs subsequent to interruption of brine flow by the float switch assembly 82. At the end of the 35-minute segment, the brine draw timer 140 then signals the start of the brine draw reclaim timer 142 and illuminates the brine cycle light 136. The brine draw reclaim timer 142 operates for 10 minutes, for purposes of illustration and example, and sends a signal to operate a brine reclaim solenoid 144. The brine reclaim solenoid 144 signals the drain valve 114 to the closed position to prevent brine from passing through the drain line 126, and signals the brine reclaim valve 116 to the open position to divert brine flow received from the bottom of the filter/softener/pressure tank 14 to the brine/solution tank 12 for brine reclamation. Reclaiming will continue until the proper refill level of reclaim brine water is used, as detected by float switch assembly 82. After the 10-minute time segment, power is removed from the brine reclaim solenoid 144 to disable current flow to the drain valve 114 and brine reclaim valve 116 and allow them to return to their normally open and normally closed position, respectively. Flush and backwash cycles remain unaffected by the inclusion of the brine filtration and regeneration system 10.

Various modifications can be made to the present invention without departing from the apparent scope hereof.

I claim:

1. A brine filtration and regeneration system with additional brine reclamation system comprising:

a. a brine solution tank containing brine solution and salt;
   b. a filter/softener tank;
   c. a brine suction line providing passage for said brine solution from said brine solution tank to said filter/softener tank;
   d. a treated water line providing passage from said filter/softener tank in parallel to a reclamation line that returns said treated water back to said brine solution tank, and to a drain pipe;
   e. a brine reclamation valve positioned in said reclamation line, and a drain valve positioned in said drain pipe;
   f. a control panel including first signal means comprising means for opening said brine reclamation valve from a normally closed position and closing said drain valve from a normally open position during a brining cycle of said system; and
   g. said control panel further includes second signal means comprising means for closing said brine reclamation valve from an open position to said normally closed position and for opening said drain valve from a closed position to said normally open position during a reclamation cycle of said system.

2. The system of claim 1, further comprising a brine float switch assembly positioned within said brine solution tank to detect a level of brine in said brine solution tank and means for sending a signal to said control panel to close said brine reclamation valve to maintain an appropriate level of brine within said brine tank.

3. The system of claim 1, further comprising two timers controlled by said control panel to control the time for said brining cycle and the time for said reclamation cycle.

4. The system of claim 1, wherein a reclamation cycle of said brine reclamation system returns at least a portion of said brine solution to said brine solution tank thereby conserving salt in said brine solution tank.

* * * * *